United States Patent

[11] 3,609,391

[72] Inventors Isao Hatano; Yashuhiko Tabata; Masatoshi Mitsui, all of Kyoto-fu, Japan

[21] Appl. No. 830,618

[22] Filed June 5, 1969

[45] Patented Sept. 28, 1971

[73] Assignee Omron Tateisi Electronics Co. Kyoto-shi, Kyoto-fu, Japan

[32] Priority June 5, 1968

[33] Japan

[31] 43/38895

[54] TIMING PULSE GENERATOR
10 Claims, 3 Drawing Figs.

[52] U.S. Cl. .......... 307/208, 307/221, 307/251, 328/63, 328/37, 328/38, 328/58

[51] Int. Cl. .......... H03k 19/08

[50] Field of Search .......... 307/208, 215, 221, 221 C, 225, 251, 265, 269; 328/37, 38, 58, 63

[56] References Cited

UNITED STATES PATENTS

| | | | |
|---|---|---|---|
| 3,274,566 | 9/1966 | McGrogan, Jr. .......... | 307/221 X |
| 3,308,384 | 3/1967 | Wright .......... | 328/37 X |

OTHER REFERENCES

Earle, " Shift Register & Binary Triggers, " I.B.M. Technical Dislcosure Bulletin, October 1961, pp. 53 & 54. 328/37

*Primary Examiner*—Stanley T. Krawczewicz
*Attorney*—Craig, Antonelli, Stewart & Hill

ABSTRACT: A timing pulse generator having a plurality of two-phase registers to generate timing pulses of desired pulse width. Each register furnishes an output from only one stage thereof on the strength of a read-in pulse and memory pulse, and the output from the stage that furnishes the output is circulated, while the output from the last stage of one shift register is utilized as the read-in pulse for the subsequent shift register.

INVENTORS
ISAO HATANO, YASUHIKO TABATA and
BY MASATOSHI MITSUI

Craig, Antonelli, Stewart & Hill ATTORNEYS

PATENTED SEP 28 1971 3,609,391

INVENTORS
ISAO HATANO, YASUHIKO TABATA and MASATOSHI MITSUI
BY
Craig, Antonelli, Stewart & Hill ATTORNEYS

TIMING PULSE GENERATOR

The present invention relates to a timing pulse generator for use in electronic calculators and more specifically to a timing pulse generator which is applicable to two-phase shift registers.

An object of the present invention is to provide a circuit for generating timing pulses of desired pulse width, without any complicated apparatus such as registers, counters, etc. In order to accomplish the purpose of the invention, a two-phase dynamic-type shift register is supplied with read-in pulses and memory pulses to provide at one stage thereof an output, which is circulated around every stage, and the logical product of an output of the last stage thereof and the read-in pulse is used as a read-in pulse fed to the subsequent shift register, whereby an output of any shift register is carried over to the subsequent shift register. Thus a plurality of shift registers can provide timing pulses of desired pulse width.

According to the present invention, it is possible to provide a read-in pulse for the subsequent shift register so as to stabilize the operation, even in case of an output of the shift register having a distorted waveform.

Other objects and features of the present invention will be made apparent in the following description and claims.

A further detailed description will be made in conjunction with a preferred embodiment of the invention with reference to the accompanying drawings, in which.

Figure 1:
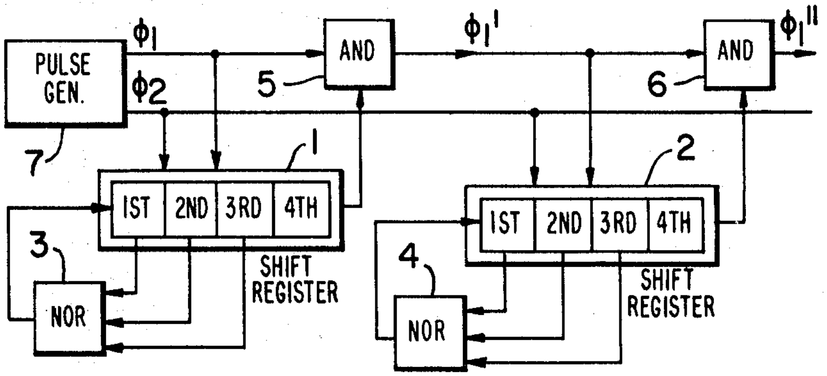
FIG. 1 shows a block diagram of an embodiment of the present invention.

Referring to FIG. 1, two-phase dynamic-type shift registers 1 and 2, each employing metal oxide semiconductor field effect transistors, are respectively constituted of four stages, i.e., of a first, second, third and fourth stage; the output of each stage except for the last stage is connected to the input of the first stage through NOR circuits 3 and 4 respectively.

In such shift registers 1 and 2 having four stages as illustrated, therefore, the input to the first stage will be zero in case there is an output in any one of the first, second and third stages. $\Phi_1$ indicates the read-in pulses for the shift register 1 and $\Phi_2$ indicates the memory pulses commonly applicable to both shift registers 1 and 2.

The pulses $\Phi_1$ and $\Phi_2$ are generated alternately by means of a pulse generator 7. The pulses $\Phi_1$ are fed also to an AND circuit 5, which is further supplied with the output of the last stage of the shift register 1. The logical product of the output of the last stage of the shift register 1 and the read-in pulse $\Phi_1$ becomes the output $\Phi_{1\,1}'$ of the AND circuit 5 and the output $\Phi_1'$ is fed to the subsequent shift register 2 as a read-in pulse. An AND circuit 6 is furnished with the output of the last stage of the shift register 2 and the read-in pulse $\Phi_1'$, the logical product of which is obtained as the output $\Phi_1''$ of the AND circuit 6; the output $\Phi_1''$ is fed to the subsequent shift register (not illustrated) as a read-in pulse.

Figure 2:
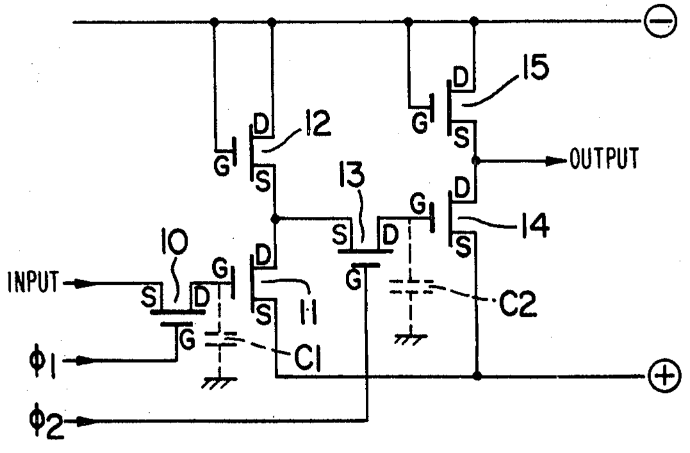
FIG. 2 illustrates a circuit diagram of any one stage of a two-phase dynamic-type shift register for use in practicing the present invention and FIG. 3 shows waveforms with reference to the output of each shift register.

FIG. 2 shows the connection of one stage of the two-phase dynamic-type shift register 1. The connection of all stages of the shift register is the same. The memory pulses $\Phi_2$ are applied to all these stages, whereas the reading pulses $\Phi_1$ are fed to each stage of the shift register 1 and the read-in pulses $\Phi_1'$ are fed to each stage of the shift register 2.

Referring to FIG. 2, 10, 11, 12, 13, 14 and 15 each denotes a respective metal oxide semiconductor field effect transistor, which is shortly referred to as MOST throughout the present specification.

The drain of the MOST 10 is connected to the gate of the MOST 11, the source of which is kept at a positive potential and the drain of which is connected to the source of the MOST 12 and the source of the MOST 13. The drain of the MOST 13 is connected to the gate of the MOST 14, the source of which is kept at a positive potential and the drain of which is connected to the source of the MOST 15. Gates and drains of the MOST's 12 and 15 are kept at a negative potential. An input is fed to the source of the MOST 10, the read-in pulses $\Phi_1$ are fed to the gate of the MOST 10 and the memory pulses $\Phi_2$ each are fed to the gate of the MOST 13. The MOST's 12 and 15 are each utilized as a load MOST.

Supposing that an input is supplied to the stage as shown in FIG. 2, the input is read in to a capacitance $C_1$ as illustrated by a broken line between the gate and the source of the MOST 11 on the strength of each of the read-in pulses $\Phi_1$ and is then transferred to a capacitance $C_2$ as illustrated by a broken line between the gate and the source of MOST 13 on the strength of each of the memory pulses $\Phi_2$ to provide an output of this stage.

Figure 3:
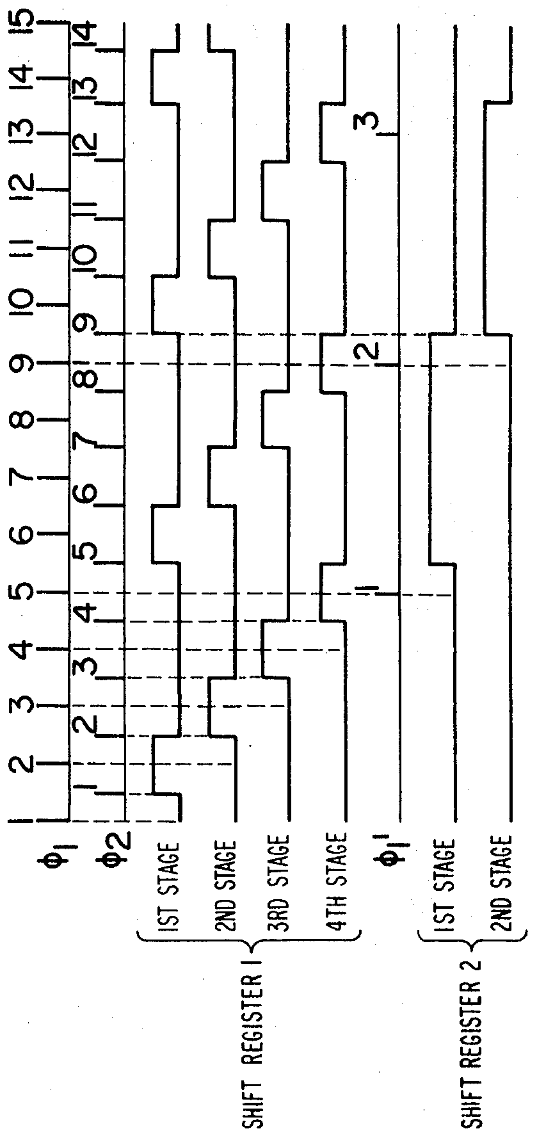

Now with reference to FIG. 3, the operation of an apparatus as shown in FIG. 1 will be explained. Supposing that there is no output in any one of the first, second and third stages of the shift register 1, an output is obtained from the NOR circuit 3 and is fed as an input to the first stage of the shift register 1. The input is read in at the first stage on the strength of the read-in pulse $\Phi_1$—1 as shown in FIG. 3 and is then taken out as an output of the following memory pulse $\Phi_2$—1. The read-in pulse $\Phi_1$—1 is fed during the middle portion of the duration of the output of the first stage. The presence of the output at the first stage makes the output of the NOR circuit 3 absent and accordingly makes the input to the first stage absent. The output of the first stage is read into the second stage on the strength of the following read-in pulse $\Phi_{1\,1}$—2 and is then taken out as an output of the second stage on the strength of the following memory pulse $\Phi_2$—2. The read-in pulse $\Phi_1$—2 is fed during the middle portion of the duration of the output of the second stage. At that time there is no out put at the first stage, but the output of the NOR circuit is also zero due to the output from the second stage, resulting in no input to the first stage.

Similarly, an output of the second stage is read into the third stage and is further taken out as an output of the third stage, at which time the output of the second stage becomes zero, resulting in no output in either the first stage or the second stage. But as the output of the NOR circuit 3 is made zero due to the output of the third stage, there is no input to the first stage.

Further, the read-in pulse $\Phi_1$—4 is supplied in the middle portion of the duration of the output of the third stage, which is read into the fourth stage to provide an output from the fourth stage, at which time no output is obtained from any one of the first through third stages, resulting in an output from the NOR circuit 3 to be fed to the first stage.

Thus the stage that furnishes the output is circulated and one cycle operation of the shift register 1 ends with a one time circulation. When the read-in pulse $\Phi_1$—5 is fed, the input is read in to the first stage of the shift register 1 and the subsequent cycle of the shift register 1 begins.

As soon as the subsequent cycle begins, the logical product of the output from the fourth or last stage and the read-in pulse $\Phi_1$—5 is obtained by means of the AND circuit 5 to furnish an output pulse $\Phi_1'$—1. The output pulse $\Phi_1'$—1 is utilized as a read-in pulse to be fed to the first stage of the subsequent shift register 2 and becomes an output of the stage on the strength of the next memory pulse $\Phi_2$—5. When an output is obtained at the fourth stage during the subsequent cycle of the shift register 1, the logical product of the output and the subsequent read-in pulse $\Phi_1$—9 to be fed to the shift register 1 is obtained in the AND circuit 5 to furnish an output pulse $\Phi_1'$—2, on the strength of which the output of the first stage of the shift register 2 is read into the second stage thereof and the output of the first stage of the shift register 2 becomes zero on the strength of the subsequent memory pulse $\Phi_2$—9, resulting in an output at the second stage thereof. Thus, the shift register 2 makes one cycle of operation during every four cycles in the shift register 1 on the strength of the read-in pulses $\Phi_2'$ and the memory pulses $\Phi_2$.

Since the operation of the shift register 2 is equivalent to that of the shift register 1, a detailed explanation thereof is omitted.

A logical product of the output from the last stage of the shift register 2 and one of the read-in pulses $\Phi_1$ is obtained from the AND circuit 6 to furnish the output pulse $\Phi_1''$, which is utilized as a read-in pulse to the subsequent shift register (not shown).

Thus, a plurality of two-phase dynamic-type shift registers are connected as described above and in any event only one of the stages of each shift register furnishes an output on the strength of the read-in pulses and the memory pulses fed to the said shift register, the output being circulated through the stages. The logical product of the output from the last stage in each shift register and the read-in pulse is utilized as a read-in pulse for the subsequent shift register and an output from a certain shift register is carried over the subsequent shift register, which makes it possible to provide the timing pulses of desired pulse width.

As clearly shown in FIG. 3, each of the read-in pulses $\Phi_1$ is supplied in the middle portion of the duration of the respective output of the each stage of the shift register 1 and especially $\Phi_1$–5, $\Phi_1$–9 etc. are supplied in the middle portion of the duration of the respective output of the fourth stage. This fact makes it possible that the output $\Phi_1'$ from the AND circuit 5 is always stabilized even in case the wave form of output from the shift register 1 is distorted.

Similarly, the output $\Phi_1''$ from the AND circuit 6 is stabilized and the stabilized read-in pulses for the subsequent shift register can always be obtained.

What is claimed is:

1. A timing pulse generator comprising:

a plurality of two-phase shift registers;

first means, connected to at least one of said shift registers, for supplying thereto a read-in pulse and a memory pulse;

second means, responsive to said first means and to the outputs of selected stages of said shift register for recirculating the output of a first predetermined stage of said one shift register; and third means, responsive to the output of a second predetermined stage of said one shift register and to a read-in pulse generated by said first means for providing a read-in pulse for another of said plurality of shift registers other than said one shift register.

2. A timing pulse generator according to claim 1 wherein said first predetermined stage and said second predetermined stage of said one shift register are the same.

3. A timing pulse generator according to claim 1, wherein said second means comprises a first logic circuit responsive to the outputs of said selected stages and connected to the input of a third predetermined stage of said one shift register for supplying an input to said third predetermined stage only when the outputs of each of said selected stages are the same.

4. A timing pulse generator according to claim 3, wherein said second means comprises an NOR circuit.

5. A timing pulse generator according to claim 3, wherein said third means comprises an AND circuit.

6. A timing pulse generator according to claim 1 wherein said selected stages of said shift register are exclusive of said first and second predetermined stages.

7. A timing pulse generator according to claim 3, wherein said selected stages of said shift register are exclusive of said first and second predetermined stages and inclusive of said third predetermined stage.

8. A timing pulse generator according to claim 1, further including a connection between said first means and each of said shift registers within said plurality of shift registers for supplying memory pulses from said first means to each of said shift registers.

9. A timing pulse generator according to claim 1, wherein each stage of each of shift registers comprises:

a first field effect transistor, the source electrode of which is connected to the input terminal of said stage and the gate electrode of which is connected to a read-in pulse terminal for receiving read-in pulses;

a first pair of series-connected field effect transistors connected between a pair of bias terminals, the gate electrode of one of said transistors of said first pair being connected to the drain electrode of said first field effect transistor;

a second pair of series-connected field effect transistors connected between said pair of bias terminals, the common electrode junction of said second pair being the output terminal of said shift register stage; and a second field effect transistor connected in series between the common electrode junction of said first pair of series connected field effect transistors and the gate electrode of one of the transistors of said second pair of series-connected field effect transistors and having its gate electrode connected to a memory pulse input terminal for receiving said memory pulses in said stage.

10. A timing pulse generator comprising a plurality of two-phase shift registers, pulse generating means for generating alternately read-in pulses for the first shift register and memory pulses for all shift registers, NOR circuits arranged correspondingly to each of said shift registers and supplied with the output from all stages excluding the last stage of a respective shift registers so as to furnish the output thereof to the first stage of the corresponding shift register, and AND circuits arranged correspondingly to each of said shift registers for furnishing the logical product of the output of the last stage of each shift register and the read-in pulse to the subsequent shift register as a read-in pulse.